Patented Sept. 21, 1954

2,689,866

UNITED STATES PATENT OFFICE 2,689,866

α-PHENYL PROPYL ALLOPHANATE AND PROCESS OF PREPARING SAME

Marvin A. Spielman, Waukegan, and Warren J. Close, Zion, Ill., assignors to Abbott Laboratories, North Chicago, Ill., a corporation of Illinois No Drawing. Application May 3, 1951, Serial No. 224,452

6 Claims. (Cl. 260—482)

This invention relates to a new chemical compound, α-phenylpropyl allophanate and to methods for its preparation.

This compound has unexpected pharmacologic properties, including anticonvulsant activity in a degree sufficient to make it useful.

The compound may be prepared by (a) combining cyanic acid with α-phenyl propanol, or by (b) ester interchange between α-phenyl propanol and the allophanic acid ester of an alcohol having a lower boiling point than α-phenyl propanol. Ethyl allophanate is the preferred ester for use as a starting material. The reaction of ester interchange is conveniently brought about by the aid of heat and any of the reagents which will cause interchange of the alcohol groups without attacking the balance of the molecule. Sodium is the preferred reagent, but it could be replaced by other alkali or alkaline earth metals or by barium oxide.

The methods of preparation are illustrated but not necessarily limited by the following examples.

Example I

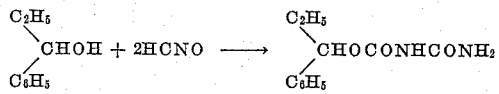

One gram of cyanuric acid is placed in a small flask connected to a 20 mm. diameter tube of which 20 cm. is heated to dull redness. The flask is heated at such a rate that the cyanuric acid sublimes into the tube in about fifteen minutes. A slow current of carbon dioxide is passed through the system throughout the operation. The effluent gasses are led into a flask containing 2 cc. of α-phenyl propanol (phenyl ethyl carbinol) cooled in an ice bath. When no more cyanic acid comes through, the flask is removed from the bath, stoppered and allowed to stand at room temperature for three days. The solid is filtered off and washed with ether, after which it melts at 145°. After recrystallization from alcohol the α-phenyl propyl allophanate melts at 149–150°.

Analysis.—Calculated for $C_{11}H_{14}N_2O_3$: N, 12.6. Found: N, 12.7.

Example II

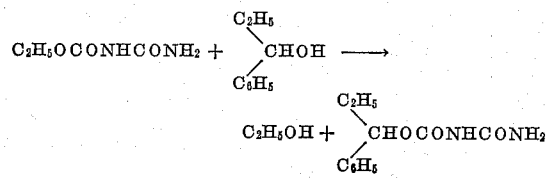

Sodium (0.1 g.) is dissolved in a mixture of 27.2 g. of α-phenylpropanol and 50 cc. of dioxan or toluene. When solution is complete, 13.2 g. of ethyl allophanate are added. A 12 cm. packed column heated to 85° C. is placed on the flask, and it is heated to refluxing for two days. The temperature is adjusted so that only an occasional drop of liquid (carrying the alcohol) comes over.

The mixture is acidified with acetic acid, and the remaining dioxan is distilled off. The mixture is taken up in about 100 cc. each of ether and water. Concentration of the ether phase produces crystalline α-phenylpropyl allophanate; melting point 150–152° C. Unreacted carbinol may be recovered by distillation of the ether filtrate.

The dioxan may be replaced by toluene and the sodium may be replaced by about 0.5 g. of barium oxide.

Others may readily adapt the invention for use under varying conditions of service, by employing one or more of the novel features disclosed, or equivalents thereof. As at present advised with respect to the apparent scope of our invention, we desire to claim the following subject matter.

We claim:

1. The compound α-phenylpropyl allophanate represented by the formula

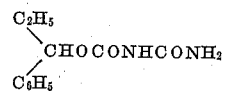

2. The process of preparing α-phenylpropyl allophanate represented by the formula

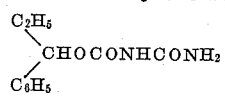

comprising heating a mixture of α-phenylpropanol and ethyl allophanate dissolved in an inert organic solvent having a boiling point between about 101 and 110° C. at the boiling point of the said mixture, whereby the lower boiling ethyl alcohol formed during the ester interchange reaction is substantially removed from the reaction mixture without decomposing the allophanate esters.

3. A process as described in claim 2 wherein the ester interchange reaction is carried out in the presence of sodium as a catalyst.

4. A process as described in claim 2 wherein the process is carried out in the presence of barium oxide as a catalyst.

5. A process as described in claim 2 wherein the inert organic solvent is dioxan.

6. A process as described in claim 2 wherein the inert organic solvent is toluene.

References Cited in the file of this patent

UNITED STATES PATENTS

| Number | Name | Date |
|---|---|---|
| 922,538 | Sprongerts | May 25, 1909 |

OTHER REFERENCES

Beilstein, "Handbuch Der Organishchen Chemie" (1931), Vierte Auflage, vol. 6, p. 253.

Sontag, Chemical Abstracts 28, columns 4716–4717 (1934).

Groggins, "Unit Processes In Org. Synthesis" (1952), 4th ed., pp. 617–20.